United States Patent
Masui

(10) Patent No.: US 7,526,977 B2
(45) Date of Patent: May 5, 2009

(54) RESIN-MADE GEARING APPARATUS

(75) Inventor: Hironori Masui, Kawaguchi (JP)

(73) Assignee: Enplas Corporation, Kawaguchi-shi, Saitama-ken (JP)

( * ) Notice: Subject to any disclaimer, the term of this patent is extended or adjusted under 35 U.S.C. 154(b) by 558 days.

(21) Appl. No.: 11/342,830

(22) Filed: Jan. 31, 2006

(65) Prior Publication Data

US 2006/0201271 A1 Sep. 14, 2006

(30) Foreign Application Priority Data

Jan. 31, 2005 (JP) ............................. 2005-023667

(51) Int. Cl.
*F16H 55/06* (2006.01)
(52) U.S. Cl. .................. 74/462; 74/457; 74/459.5; 74/DIG. 10; 74/411; 74/409
(58) Field of Classification Search ............... 74/440, 74/409, DIG. 10, 411, 410, 457, 459.5, 460, 74/461, 462
See application file for complete search history.

(56) References Cited

U.S. PATENT DOCUMENTS

| 5,870,928 | A | * | 2/1999 | Genter et al. | ................. | 74/440 |
| 5,964,150 | A | * | 10/1999 | Kato et al. | .................. | 101/216 |
| 6,354,395 | B1 | * | 3/2002 | Cheng et al. | ................. | 180/444 |
| 7,128,183 | B2 | * | 10/2006 | Saruwatari et al. | .......... | 180/444 |
| 2005/0160852 | A1 | * | 7/2005 | Takeuchi et al. | .............. | 74/414 |
| 2006/0201271 | A1 | * | 9/2006 | Masui | ......................... | 74/409 |
| 2007/0180943 | A1 | * | 8/2007 | Daout | ......................... | 74/457 |

FOREIGN PATENT DOCUMENTS

JP 55-100745 7/1980

* cited by examiner

*Primary Examiner*—David M Fenstermacher
(74) *Attorney, Agent, or Firm*—McDermott Will & Emery LLP

(57) ABSTRACT

A resin-made gearing apparatus that includes a configuration in which only one tooth flank side of each tooth in one of a pair of gears is provided with an overhang section that is disposed on at least one end portion in a tooth width direction, and overhangs diagonally from the one tooth flank side toward the adjacent tooth side; an end portion in a tooth width direction of each tooth in the other gear is provided with a lightening section that is disposed in a tooth flank of each tooth on an end face on the side of the end portion corresponding to the overhang section of the one gear, so that when the opposite teeth of the pair of gears are meshed with each other, the overhang section of the one gear is elastically deformed and also the lightening section of the other gear is elastically deformed, to absorb a backlash. Thus, the backlash appearing at the meshing of the pair of rein-made gears is absorbed by a backlash absorbing section comprised of the overhang section and the lightening section, and also, the deformation of and stress in the backlash absorbing section are reduced.

4 Claims, 8 Drawing Sheets

THE MAIN DIRECTION OF ROTATION

THE MAIN DIRECTION OF ROTATION

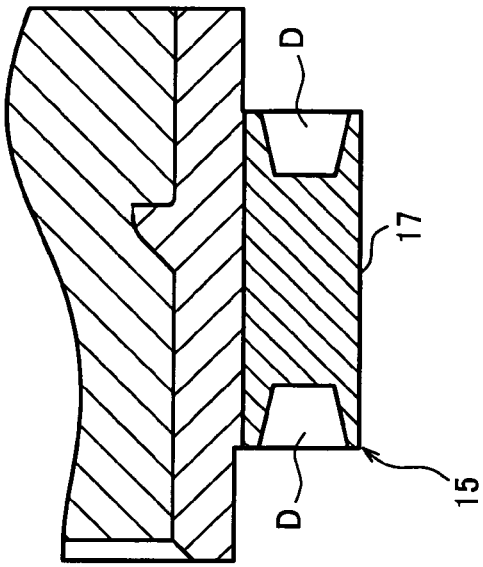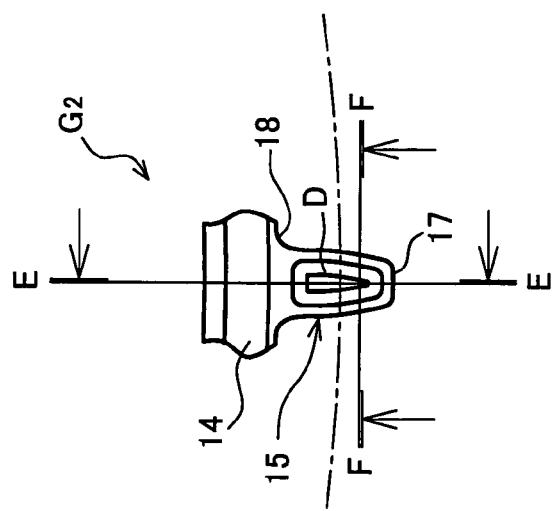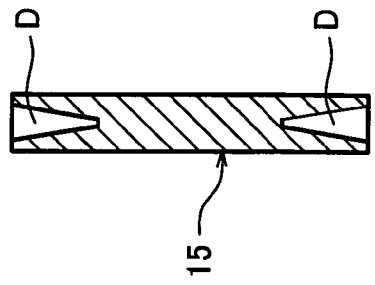

RESIN-MADE GEARING APPARATUS

BACKGROUND OF THE INVENTION

1. Field of the Invention

The present invention relates to a gearing apparatus for transmitting a rotational motion between two shafts by assembling a pair of resin-made toothed wheels (it will be referred to as gears hereinafter) to engage opposite teeth with each other, and in particular, to a resin-made gearing apparatus for absorbing a given amount of backlash appearing upon engagement of the pair of gears by a backlash absorbing section and also for reducing the deformation and stress of the backlash absorbing section.

2. Description of the Related Art

The resin-made gearing apparatus of this type is characterized in that it is lightweight compared with a metal gearing apparatus, and also is capable to be used without the lubrication due to the self-lubricity thereof and in low noise. Further, the resin-made gearing apparatus, such as a molded plastic gear or the like, has a characteristic of high mass-production to achieve the reduction of product cost. Therefore, in recent years, the molded plastic gear has been widely used for a gear train in an ink jet printer, a gear train in a power transmission section of an automotive component or in a precision machine or instrument, and the like.

Here, generally, between teeth oppositely mating with each other in the assembly of a pair of gears, a clearance (play) called a backlash is disposed. This backlash is disposed for preventing the friction of a tooth surface of the gear due to a tooth profile error, an assembly error or the like, and also, for smoothing the meshing of the gear teeth.

However, in the recent gearing apparatus, the significantly high accuracy in the transmission of rotational motion is often required. For example, in certain types of angle sensors, it is required to transmit to the output side a detected angle at an absolute accuracy without involving any error. In this case, a backlash in the pair of meshed gears causes generation of an error in the transmission of rotational motion. Accordingly, there is a demand for a gearing apparatus whose backlash is constantly nil irrespective of an operative temperature environment or a dimensional error of the gears. As one measure for satisfying such a demand, a gear, which is free of backlash (it will be referred to as a backlash-less gear hereinafter) has conventionally been proposed.

According to the conventional backlash-less gear, as shown in FIG. 10 for example, a gear 50 is formed with a fin portion 52 on each of both tooth flanks on one end side in a tooth width direction of each tooth 51, to be in contact with a mated or meshed gear, thereby absorbing any shock at the time coming into mating contact by the deformation of the fin portion 52 (refer to Japanese Unexamined Utility Model Publication No. 55-100745 (FIG. 1 and FIG. 3)).

However, in the above described conventional backlash-less gear, the elastically deformable fin portion 52 is formed only on each end portion in the tooth width direction of each tooth, in one of the assembly of the pair of gears, but any contrivance is not provided on each tooth of the other meshed gear. Therefore, the fin portion 52 on the tooth in the one gear may be in direct contact with a tooth flank of the tooth of the other meshed gear so that both gears must be subjected to a high stress. Namely, although the fin portion 52 on each of the end portions in the tooth width direction in the one gear is elastically deformable, the tooth flank of each tooth in the other meshed gear forms a power transmitting plane which is not elastically deformed. Hence, the fin portion 52 in the one gear may come in contact with the power transmission plane, to be deformed to an extent exceeding an elastic limit range. In particular, in the case where the fin portion 52 in the one gear is consecutively formed along the periphery of the tooth profile to be folded in a U-shape at a tooth crest portion, the high stress mainly acts on the folded portion, and in an extreme case, it is deemed that the fin portion 52 of the tooth in the one gear is broken.

SUMMARY OF THE INVENTION

In view of the above problems, an object of the present invention is to provide a resin-made gearing apparatus for absorbing a given amount of backlash by a backlash absorbing section upon engagement of a pair of gears by meshing, and also for reducing a deformation and stress of the backlash absorbing section.

Taking the above-mentioned object into consideration, in accordance with a first aspect of the present invention, there is provided a resin-made gearing apparatus for transmitting a rotational motion between two shafts by an engagement of a pair of resin-made gears arranged to have opposite teeth meshed with each other, comprising a configuration wherein only one tooth flank side of each tooth in one of the gears is provided with an overhang section that is disposed on at least one of end portions in a direction of tooth width, and overhangs diagonally from the one tooth flank side toward an adjacent tooth side to eliminate a backlash during a time when the pair of gears are meshed with each other;

an end portion in a direction of a tooth width of each tooth of the other gear, corresponding to the overhang section of the each tooth of the one gear, is provided with a lightening section that is disposed at an end face on the side of the end portion and inside a profile of the each tooth of the other gear; and the overhang section of the one gear as well as the lightening section of the other gear are elastically deformed due to meshing of the teeth of the pair of gears during the rotation of the pair of gears, to thereby absorb a given amount of backlash.

According to such a configuration of the first aspect of the present invention, only the one tooth flank side of the one gear is provided with the overhang section that is disposed on at least one of the end portions in the tooth width direction, and overhangs diagonally from the one tooth flank side toward the adjacent tooth side, and the end portion in the tooth width direction of each tooth of the other gear is provided with the lightening section that is disposed at the end face on the side of the end portion, corresponding to the overhang section of the one gear, so that when the opposite teeth of the pair of gears are meshed with each other due to the rotation of the pair off gears, the overhang section of the one gear is elastically deformed and also the lightening section of the other gear is elastically deformed so as to absorb the given amount of backlash. Consequently, it is possible to absorb the backlash at the time of meshing of the pair of gears by the overhang section of the one gear and the lightening section of the other gear, and also, to reduce the deformation and stress in each of the overhang section and the lightening section.

Further, in accordance with a second aspect of the present invention, there is provided a resin-made gearing apparatus for transmitting a rotational motion between two shafts by an engagement of a pair of resin-made gears arranged to have opposite teeth meshed with each other, comprising a configuration wherein both tooth flank sides of each tooth of one of the gears are provided with overhang sections that are disposed on at least one of end portions in a direction of tooth width, each of which overhangs diagonally from each of the both tooth flank sides toward an adjacent tooth side to eliminate a backlash during a time when the pair of gears are meshed with each other;

an end portion in a direction of a tooth width of each tooth of the other gear, corresponding to the overhang sections of the each tooth of the one gear, is provided with a lightening section that is disposed at an end face on the side of the end portion and inside a profile of the each tooth of the other gear; and the overhang sections of the one gear as well as the lightening section of the other gear are elastically deformed due to meshing of the teeth of the pair of gears during the rotation of the pair of gears, to thereby absorb a given amount of backlash.

According to such a configuration of the second aspect of the present invention, both tooth flank sides of each tooth in the one gear are provided with the overhang sections that are disposed on at least one of the end portions in the tooth width direction, each of which overhangs diagonally from the one tooth flank side toward the adjacent tooth side, and the end portion in the tooth width direction of each tooth in the other gear is provide with the lightening section that is disposed at the end face on the side of each end portion corresponding to the overhang section of the one gear, so that when the opposite teeth of the pair of gears are meshed with each other, the overhang sections of the one gear are elastically deformed and also the lightening section of the other gear is elastically deformed so as to absorb the backlash. Consequently, it is possible to absorb the backlash at the meshing of the pair of gears by the overhang sections of the one gear and the lightening sections of the other gear, and also, to reduce the deformation and stress in each of the overhang section and the lightening section.

Moreover, in accordance with a third aspect of the present invention, there is provided a resin-made gearing apparatus for transmitting a rotational motion between two shafts by an engagement of a pair of resin-made gears arranged to have opposite teeth meshed with each other, comprising a configuration wherein only one tooth flank side of each tooth of one of the gears is provided with an overhang section that is disposed on at least one of end portions in a direction of tooth width, and overhangs diagonally from the one tooth flank side toward an adjacent tooth side to eliminate a backlash during a time when the pair of gears are meshed with each other;

only one tooth flank side of each tooth of the other gear is provided with an opposite overhang section that is disposed on an end portion, corresponding to the overhang section of the each tooth of the one gear, and overhangs diagonally from the one tooth flank side toward adjacent tooth side; and the overhang section of the one gear as well as the opposite overhang section of the other gear are elastically deformed due to meshing of the teeth of the pair of gears during the rotation of the pair of gears, to thereby absorb a given amount of backlash.

According to such a configuration of the third aspect of the present invention, only the one tooth flank side of each tooth in the one gear is provided with the overhang section that is disposed on at least one of the end portions in the tooth width direction, and overhangs diagonally from the one tooth flank side toward the adjacent tooth side, and only the one tooth flank side of each tooth in the other gear is provided with the opposite overhang section that is disposed on the end portion, corresponding to the overhang section of the one gear, and overhangs diagonally from the one tooth flank side toward the adjacent tooth side, so that when the opposite teeth of the pair of gears are meshed with each other during the rotation of the pair of gears, the overhang section of the one gear is elastically deformed and also the opposite overhang section of the other gear is elastically deformed so as to absorb the backlash. Consequently, it is possible to absorb the backlash during the meshing of the pair of resin-made gears by the overhang section of the one gear and the opposite overhang section of the other gear, and also, to reduce the deformation of and stress in each of the overhang section and the opposite overhang section. Further, in this case, since the overhang section of the one gear and the opposite overhang section of the other gear cooperatively absorb the backlash, an amount of overhanging of the overhang section of either one of both gears can be reduced to approximately a half, respectively.

Furthermore, in accordance with a fourth aspect of the present invention a resin-made gearing apparatus for transmitting a rotational motion between two shafts by an engagement of a pair of resin-made gears arranged to have opposite teeth meshed with each other, comprising a configuration wherein both tooth flank sides of each tooth of one of the gears are provided with overhang sections that are disposed on at least one of end portions in a direction of tooth width, each of which overhangs diagonally from each of the both tooth flank sides toward an adjacent tooth side to eliminate a backlash during a time when the pair of gears are meshed with each other;

both tooth flank sides of each tooth of the other gear are provided with opposite overhang sections that are disposed on end portion, corresponding to the overhang sections of the each tooth of the one gear, each of which overhangs diagonally from each of the both tooth flank sides toward adjacent tooth sides; and the overhang sections of the one gear as well as the opposite overhang sections of the other gear are elastically deformed due to meshing of the teeth of the pair of gears during the rotation of the pair of gears, to thereby absorb a given amount of backlash.

According to such a configuration of the fourth aspect of the present invention, both tooth flank sides of each tooth in one of the gears are provided with the overhang sections that are disposed on at least one of end portions in a tooth width direction, each of which overhangs diagonally from each of both tooth flank sides toward the adjacent tooth side, and both tooth flank sides of each tooth in the other gear are provided with the opposite overhang sections that are disposed on each end portion, corresponding to the overhang section of the one gear, each of which overhangs diagonally from each of both tooth flank sides toward the adjacent tooth side, so that when the opposite teeth of the pair of gears are meshed with each other, the overhang sections of the one gear are elastically deformed and also the opposite overhang sections of the other gear are elastically deformed so as to absorb the backlash. Consequently, it is possible to absorb the backlash at the meshing of the pair of gears by the overhang sections of the one gear and the opposite overhang sections of the other gear, and also, to reduce the deformation of and stress in each of the overhang section and the opposite overhang section. Further, in this case, since the backlash is absorbed by the overhang sections of the one gear and the opposite overhang sections of the other gear, an overhanging amount of each of the overhang section of the one gear can be reduced to approximately a half.

The other objects and features of the invention will become understood from the following description with reference to the accompanying drawings.

BRIEF DESCRIPTION OF THE DRAWINGS

FIG. 6 is a diagram showing a shape of the other gear in the pair of gears, in which FIG. 6A is a main part front view showing one tooth, FIG. 6B is a cross section along E-E line in FIG. 6A, and FIG. 6C is a cross section along F-F line in FIG. 6A;

FIG. 7 is a diagram showing a second embodiment of the shape of the one gear, in which

FIG. 8 is a diagram showing the tooth of the one gear according to the second embodiment, in which

FIG. 9 is a diagram showing a third embodiment of the shape of the one gear, in which

DETAILED DESCRIPTION OF THE INVENTION

There will be described hereunder preferred embodiments of the present invention based on the appended drawings.

Figure 1:
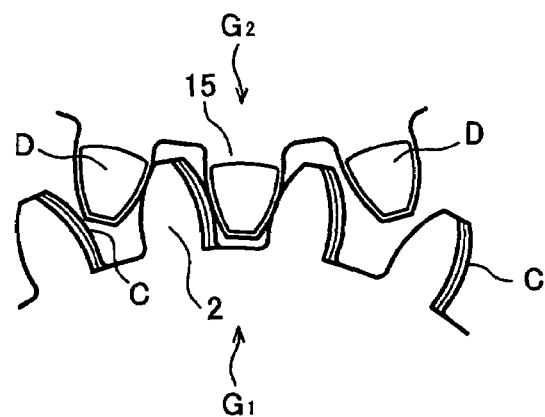
FIG. 1 is a diagram showing an embodiment of a resin-made gearing apparatus according to the present invention, for explaining a main part of the apparatus in a state where a pair of gears is mated with each other.

FIG. 1 is a diagram showing an embodiment of a resin-made gearing apparatus according to the present invention, for explaining a main part of the apparatus in a state where a pair of gears is mated with each other. This resin-made gear apparatus is provided for transmitting a rotational motion between two shafts by an engagement of a pair of resin-made gears having opposite teeth meshed with each other, and is configured by combining one gear $G_1$ and the other gear $G_2$. The one gear $G_1$ is, for example a gear having a small number of teeth, and is usually called a pinion. The other gear $G_2$ is, for example a gear having a large number of teeth, and is usually called a main gear.

In the one gear $G_1$, only on one tooth flank side of each tooth, an overhang section C is disposed on both of or one of end portions in a direction of tooth width (it will be referred to as a tooth width direction herein after), which overhangs diagonally from the one tooth flank side to the adjacent tooth side to eliminate a backlash during a time when the pair of gears $G_1$ and $G_2$ is in meshed engagement with each other due to the rotation of the pair of gears $G_1$ and $G_2$. Further, in the other gear $G_2$, both of or one of end portions in a tooth width direction of each tooth are provided with a lightening section D that is provided as an unfilled portion disposed inside a tooth profile of each tooth on an end face on the side of the end portion corresponding to the overhang section C of the one gear $G_1$.

Figure 2:
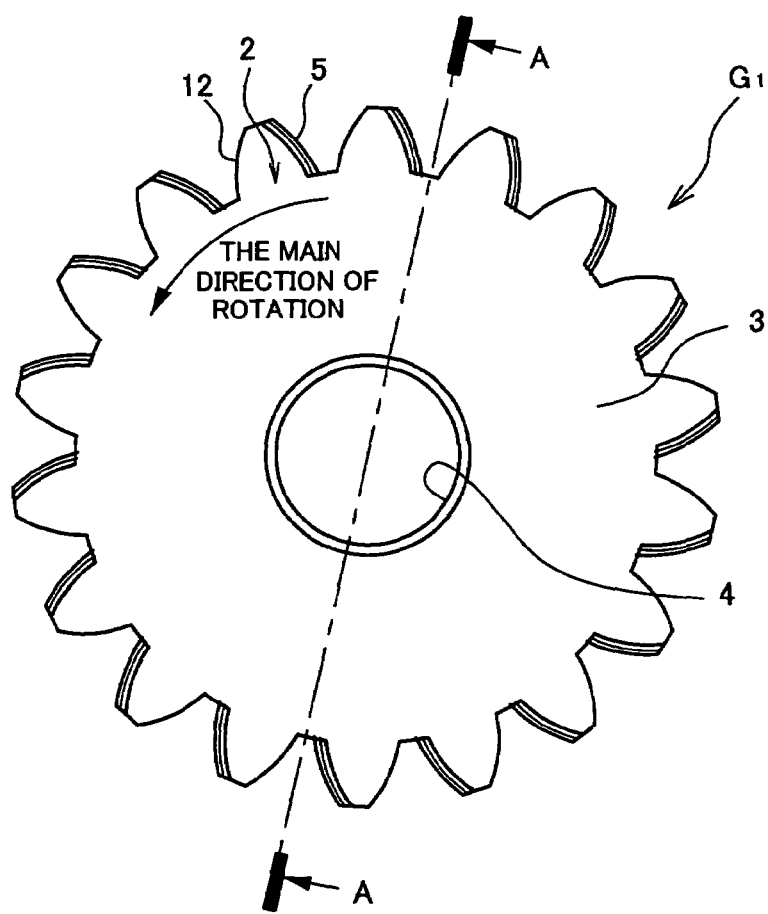
FIG. 2 is a front view showing one of the pair of gears.
Figure 3:
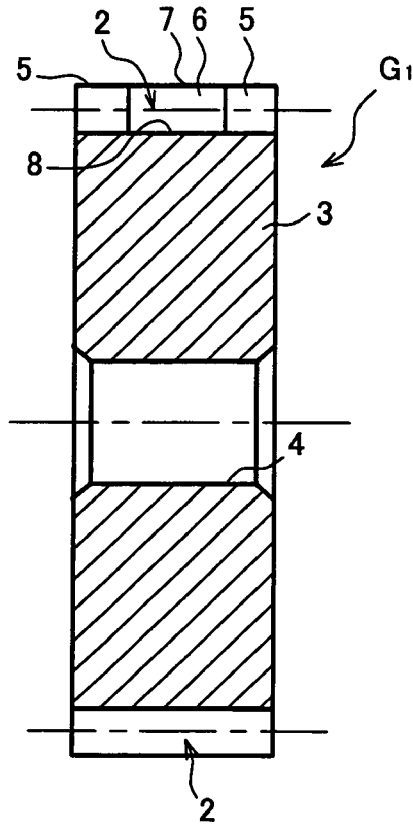
FIG. 3 is a cross section along A-A line in FIG. 2.

Firstly, a shape of the one gear $G_1$ will be described referring to FIG. 2 through FIG. 5. The gear $G_1$ is a spur gear which is formed by the injection molding using a resin material, for example, polyacetal, polyamide, polyphenylene sulfide, polybutylene terephthalete or the like. As shown in FIG. 2, in the gear $G_1$, a plurality of teeth 2 is formed on the outer peripheral side of a web 3 of approximately circular plate shape, and a shaft hole 4 for fixing therein a rotating shaft is bored at the central portion of the web 3. Further, as shown in FIG. 3, each tooth 2 has a predetermined tooth width in an axial direction.

Figure 4:
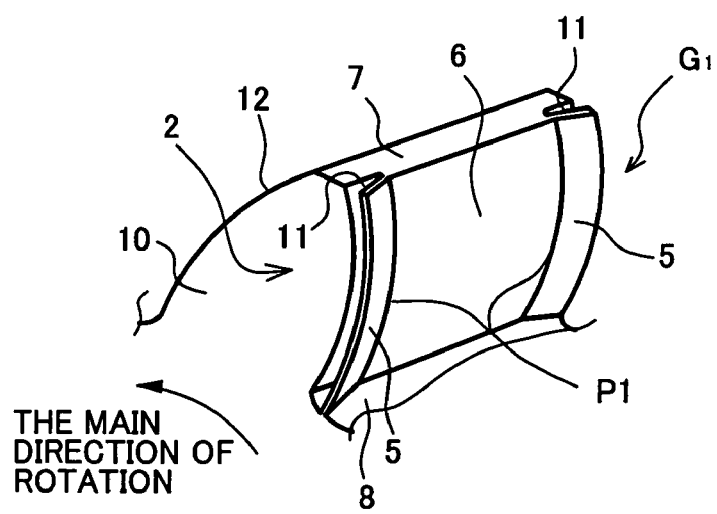
FIG. 4 is a perspective view showing a first embodiment of a shape of the one gear.

Then, as shown in FIG. 4, only one tooth flank 6 side of each tooth 2 of the gear $G_1$ is provided with a thin overhang member 5 serving as the overhang section C and disposed on both end portions in the tooth width direction, respectively. This overhang member 5 serves as a backlash absorbing section for eliminating the backlash during a time when the pair of gears $G_1$ and $G_2$ is in a meshed engagement with each other, and overhangs diagonally from the one tooth flank 6 side of the tooth 2 toward the adjacent tooth 2. Namely, on the one tooth flank 6 side of the tooth 2, the overhang member 5 having the approximately uniform thickness is formed to protrude from a tooth crest 7 toward a bottom land 8, and a protruding amount of the overhang member 5 is gradually increased toward both ends in the tooth width direction.

This overhang member 5 protrudes toward the adjacent tooth 2 by a dimension approximately same the backlash which is set between the tooth of the gear $G_1$ and at least the tooth of the meshed gear $G_2$, and a clearance 11 is formed between an end portion 10 of the tooth 2 and the overhang member 5. The clearance 11 has a depth thereof measured in the tooth width direction, which extends toward a position approximately coincident with a starting position P1 of the overhang member 5 and also extends from the tooth crest 7 to the bottom land 8 along the one tooth flank 6. As in the above manner, in the case where the clearance 11 is formed along the overhang member 5, when the overhang member 5 is pressed to be deformed by the tooth flank of the mating gear $G_2$, the deformed overhang member 5 is received and accommodated in the clearance 11 so as to prevent the overhang member 5 from doing any counteraction against contacting of the gears $G_1$ and $G_2$ which are meshed with each other.

Namely, in the gear $G_1$ in this embodiment, the other tooth flank 12 (on which the overhang member 5 is not formed) of the tooth 2 serves as a power transmission plane which is in contact with the tooth flank of the meshed gear $G_2$ to transmit the rotational motion. In the case where the gear $G_1$ is rotated in reverse to a main rotational direction to transmit the rotational motion, if the overhang member 5 is pressed to be deformed by the tooth flank of the meshed gear $G_2$, the deformed overhang member 5 is accommodated in the clearance 11. Therefore, the overhang member 5 does not protrude from the one tooth flank 6 toward the outside, so that high rigid tooth flanks can be in contact with each other, to thereby enable the accurate transmission of the rotational motion even in the case where the gear $G_1$ is rotated in reverse.

Figure 5:
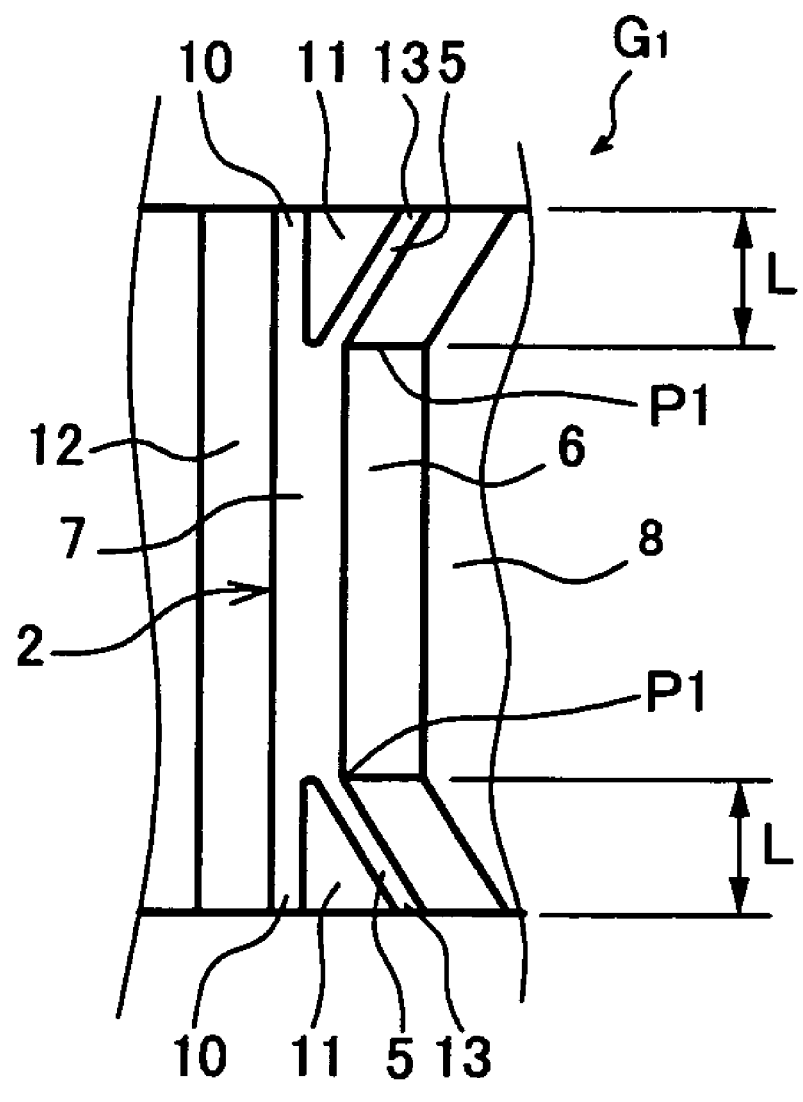
FIG. 5 is a plan view showing a tooth of the one gear viewed from a tooth crest.

Here, as shown in FIG. 5, a dimension L from an edge 13 in the tooth width direction to the starting position P1, of the overhang member 5, is determined to be an optimum dimension based on a tooth width dimension, the thickness of the overhang member 5 and the like. For example, in a gear whose module is about 0.5 mm to 2.0 mm, if the thickness of the overhang member 5 is about 0.2 mm, the dimension L is determined to be about ⅙ to ¼ of the tooth width dimension. Note, the depth of cut of the clearance 11 is determined to have a dimension approximately same as the dimension L of the overhang member 5.

In the example shown in FIG. 3 through FIG. 5, the overhang member 5 is disposed on each of the end portions in the tooth width direction, on the one tooth flank 6 side of the tooth 2. However, the present invention is not limited thereto, and the overhang member 5 may be provided to be disposed only on either one of the end portions in the tooth width direction.

Next, a description of a shape of the other gear $G_2$ will be provided referring to FIG. 6. The gear $G_2$ is also a spur gear which is formed by the injection molding using a resin material, for example, polyacetal, polyamide, polyphenylene sulfide, polybutylene terephthalete or the like. As shown in FIG. 6A, in the gear $G_2$, a plurality of teeth 15 is formed on the outer peripheral side of a web 14 of approximately circular plate shape, and each tooth 15 has the predetermined tooth thickness along a pitch circle thereof.

Then, as shown in FIG. 6B and FIG. 6C, on each end face of both end portions in a teeth width direction of each tooth 15, a lightening section D formed as an unfilled portion is disposed in a teeth profile of the tooth 15. The lightening section D serves as a backlash absorbing section, which elastically deforms the overhang section C of the one gear $G_1$ and also elastically deforms the end portion of the other gear $G_2$ to eliminate a given amount of backlash, when the opposite teeth of the pair of gears $G_1$ and $G_2$ are meshed with each other, and is cut out into a wedge shape for example, by a predetermined depth from each end face of both end portions of the tooth 15 into the inside thereof in the tooth width direction of that tooth 15. At this time, as shown in FIG. 6C, the lightening section D is made wider toward the end face of each end portion in the tooth width direction of the tooth 15, so that the remained member becomes thin to be deformable. In FIG. 6A, numeral 17 denotes a tooth crest of the tooth 15 and numeral 18 denotes a bottom land of the tooth 15.

In the example shown in FIG. 6, the lightening section D is disposed on each end face of both end portions in the tooth width direction of the tooth 15. However, the present invention is not limited thereto, and the lightening section D may be disposed only on the end face on the end portion side corresponding to the overhang member 5 of the one gear $G_1$.

Figure 7A:
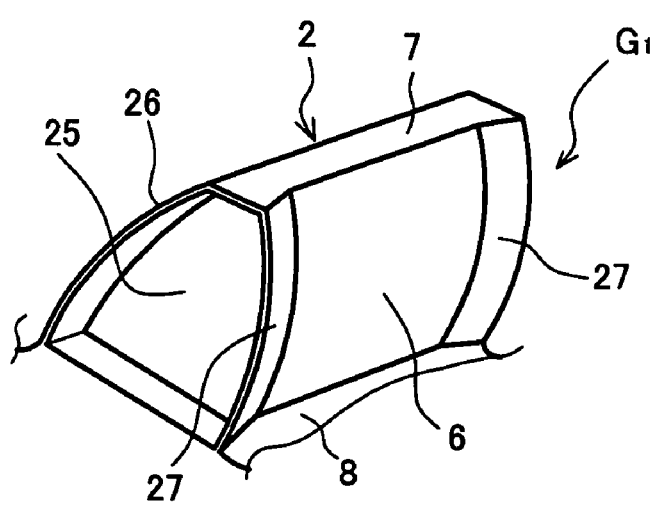
FIG. 7A is a perspective view thereof and FIG. 7B is a plan view showing one tooth viewed from a tooth crest.
Figure 7B:
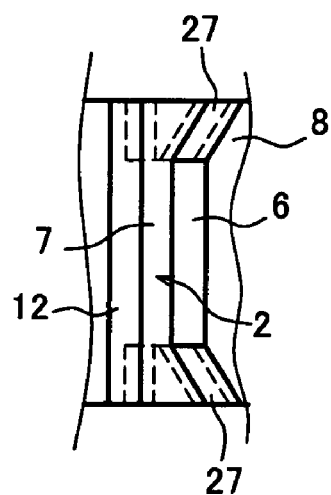
Figure 8A:
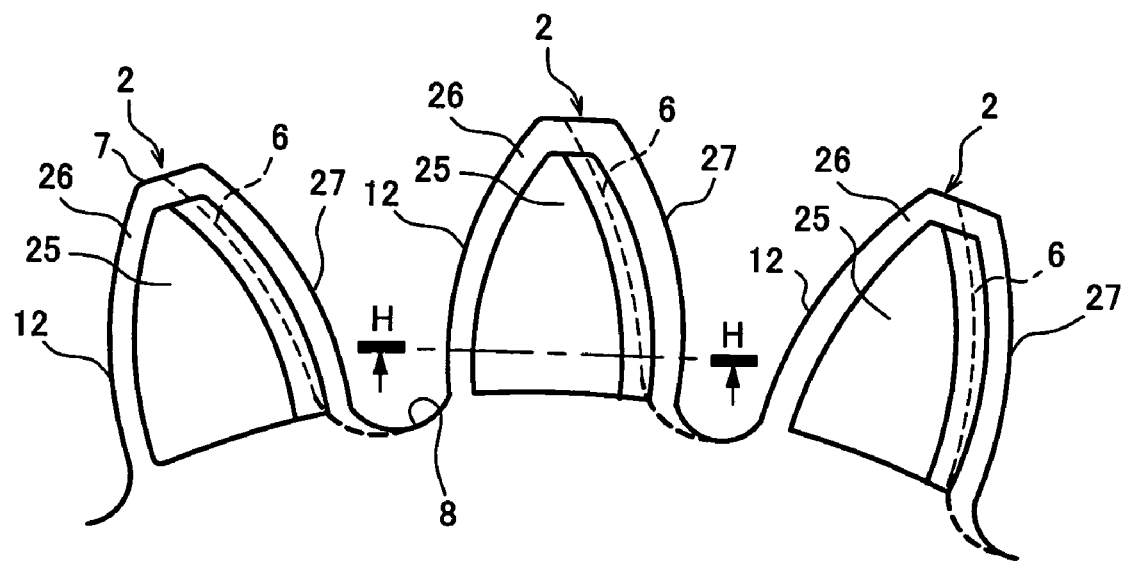
FIG. 8A is an enlarged main part front view showing the teeth alignment.
Figure 8B:
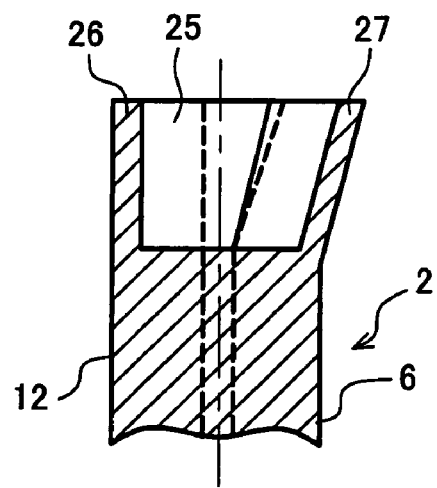
FIG. 8B is a cross section along H-H line in FIG. 8A.

FIGS. 7 and 8 are explanation diagrams showing a second embodiment of the shape of the one gear $G_1$. In this embodiment, a cavity portion 25 is formed on each of end portion sides in the tooth width direction of the tooth 2, and a thin portion 26 is formed so as to surround the cavity portion 25. Further, a part of the thin portion 26, which is disposed on the one tooth flank 6 side, is formed so as to overhang toward the adjacent tooth 2 side, to thereby be used as a thin overhang member 27.

Similarly to the embodiment shown in FIG. 4, on the one tooth flank 6 side of each end portion in the tooth width direction of the tooth 2, this overhang member 27 is formed to protrude from the tooth crest 7 toward the bottom land 8 so as to have the approximately uniform thickness, and a protruding amount of the overhang member 27 is gradually increased toward each end in the tooth width direction. A dimension of depth of the cavity portion 25 is same as the depth of cut of the clearance 11 as shown in FIG. 4, and the thickness of the overhang member 27 is same as the thickness of the overhang member 5 shown in FIG. 4.

In the example shown in FIG. 7, the overhang member 27 is disposed on each end portion in the tooth width direction, on the one tooth flank 6 side of the tooth 2. However, the present invention is not limited thereto, and the overhang member 27 may be disposed only on either one of the end portions in the tooth width direction.

Figure 9A:
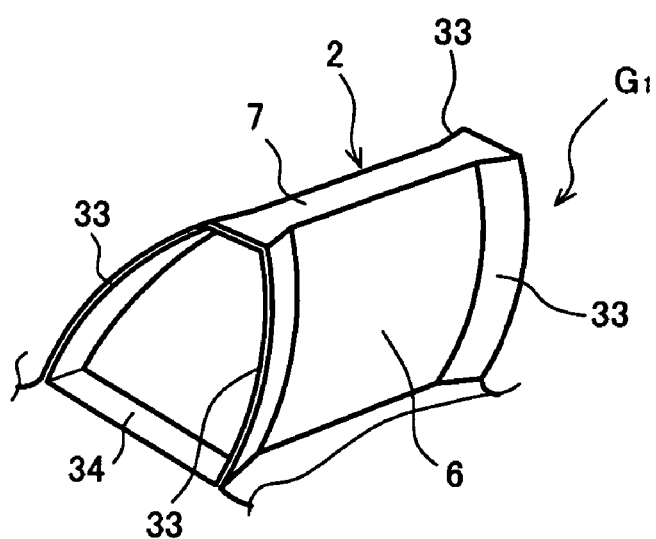
FIG. 9A is a perspective view thereof and FIG. 9B is a plan view showing one tooth viewed from a tooth crest.
Figure 9B:
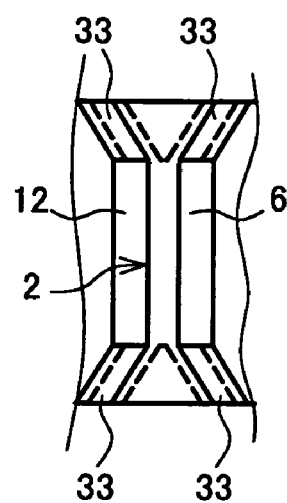
Figure 10A:
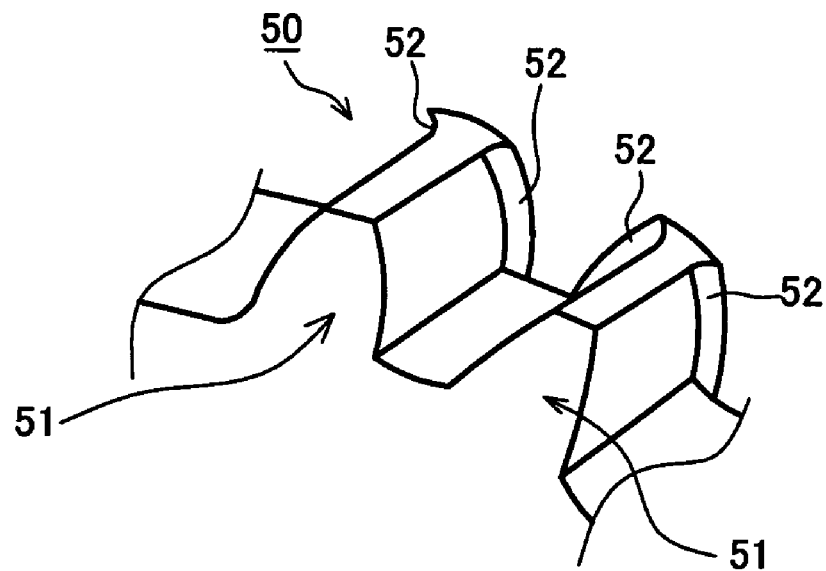
FIG. 10 is an explanation view showing a shape of a conventional backlash-less gear.
Figure 10B:
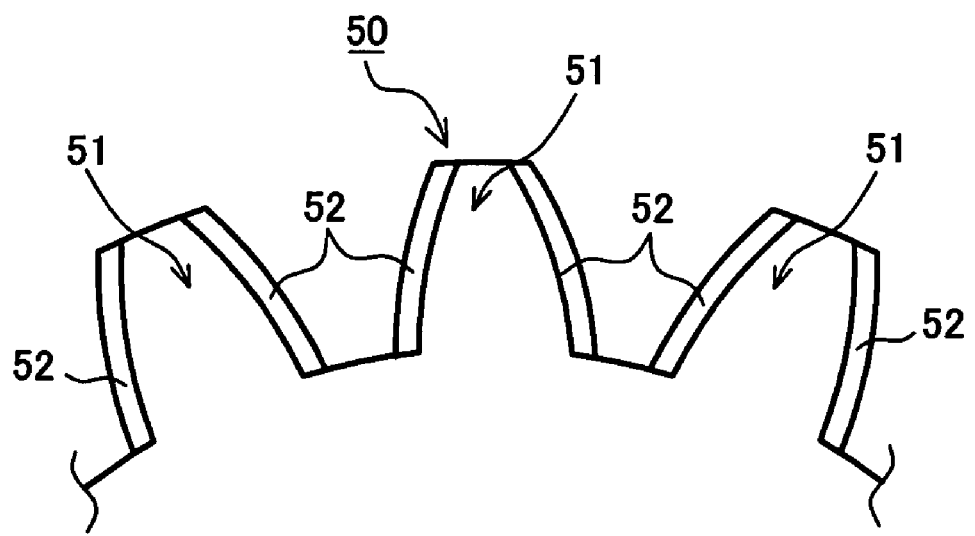

FIG. 9 is an explanation diagram showing a third embodiment of the shape of the one gear $G_1$. In this embodiment, on each of both sides of the one tooth flank 6 and of the other tooth flank 12 on each end portion in the tooth width direction of the tooth 2, a thin overhang member 33 is formed to overhang to the adjacent tooth 2 side, respectively. Namely, the overhang member 33, which is formed similarly to the overhang member 27 on the side of the one tooth flank 6 as shown in FIG. 7, is also formed on the side of the other tooth flank 12.

In this embodiment, since the backlash is absorbed by the overhang members 33 on the tooth flanks 6 and 12, an overhanging amount of each overhang member 33 can be made only approximately a half of an overhanging amount of the overhang member 27 as shown in FIG. 7.

In the example shown in FIG. 9, the overhang member 33 is disposed on each of the end portions in the tooth width direction, on each side of the one tooth flank 6 and of the other tooth flank 12 of the tooth 2. However, the present invention is not limited thereto, and the overhang member 33 may be disposed only on either one end portion in the tooth width direction.

Further, in the above description, as shown in FIG. 1 and FIG. 6, as the backlash absorbing section for the other gear $G_2$, the lightening section D is disposed as an unfilled portion formed in the tooth profile of the tooth 15 on the end portion in the tooth width direction of the tooth 15 of the other gear $G_2$. However, the present invention is not limited thereto, and similarly to FIG. 4, FIG. 7 or FIG. 9, on the one tooth flank side or on each tooth flank side of the tooth 15 of the other gear $G_2$, there may be disposed an opposite overhang member (not shown in the figure), which overhangs diagonally from the one tooth flank side or each tooth flank side toward the adjacent tooth side, on the end portion corresponding to each of the overhang members 5, 27 and 33 of the one gear $G_1$.

In such a case, the overhang members 5, 27 and 33 of the one gear $G_1$, and the opposite overhang members of the other gear $G_2$, absorb the backlash, and therefore, the overhang amount of each of the overhang members 5, 27 and 33 of the one gear $G_1$ can be reduced to only approximately a half.

I claim:

1. A resin-made gearing apparatus for transmitting a rotational motion between two shafts by an engagement of a pair of resin-made gears arranged to have opposite teeth meshed with each other, comprising a configuration wherein
    only one tooth flank side of each tooth in one of the gears is provided with an overhang section that is disposed on at least one of end portions in a direction of tooth width, and overhangs diagonally from said one tooth flank side toward an adjacent tooth side to eliminate a backlash during a time when said pair of gears are meshed with each other;
    an end portion in a direction of a tooth width of each tooth of the other gear, corresponding to said overhang section of said each tooth of the one gear, is provided with a lightening section that is disposed at an end face on the side of the end portion and inside a profile of said each tooth of the other gear; and
    said overhang section of the one gear as well as said lightening section of the other gear are elastically deformed due to meshing of the teeth of said pair of gears during the rotation of said pair of gears, to thereby absorb a given amount of backlash.

2. A resin-made gearing apparatus for transmitting a rotational motion between two shafts by an engagement of a pair of resin-made gears arranged to have opposite teeth meshed with each other, comprising a configuration wherein
    both tooth flank sides of each tooth of one of the gears are provided with overhang sections that are disposed on at least one of end portions in a direction of tooth width, each of which overhangs diagonally from each of said both tooth flank sides toward an adjacent tooth side to eliminate a backlash during a time when said pair of gears are meshed with each other;

an end portion in a direction of a tooth width of each tooth of the other gear, corresponding to the overhang sections of said each tooth of the one gear, is provided with a lightening section that is disposed at an end face on the side of the end portion and inside a profile of said each tooth of the other gear; and said overhang sections of the one gear as well as said lightening section of the other gear are elastically deformed due to meshing of the teeth of said pair of gears during the rotation of said pair of gears, to thereby absorb a given amount of backlash.

3. A resin-made gearing apparatus for transmitting a rotational motion between two shafts by an engagement of a pair of resin-made gears arranged to have opposite teeth meshed with each other, comprising a configuration wherein only one tooth flank side of each tooth of one of the gears is provided with an overhang section that is disposed on at least one of end portions in a direction of tooth width, and overhangs diagonally from said one tooth flank side toward an adjacent tooth side to eliminate a backlash during a time when said pair of gears are meshed with each other;

only one tooth flank side of each tooth of the other gear is provided with an opposite overhang section that is disposed on an end portion, corresponding to said overhang section of said each tooth of the one gear, and overhangs diagonally from said one tooth flank side toward adjacent tooth side; and said overhang section of the one gear as well as said opposite overhang section of the other gear are elastically deformed due to meshing of the teeth of said pair of gears during the rotation of said pair of gears, to thereby absorb a given amount of backlash.

4. A resin-made gearing apparatus for transmitting a rotational motion between two shafts by an engagement of a pair of resin-made gears arranged to have opposite teeth meshed with each other, comprising a configuration wherein both tooth flank sides of each tooth of one of the gears are provided with overhang sections that are disposed on at least one of end portions in a direction of tooth width, each of which overhangs diagonally from each of said both tooth flank sides toward an adjacent tooth side to eliminate a backlash during a time when said pair of gears are meshed with each other;

both tooth flank sides of each tooth of the other gear are provided with opposite overhang sections that are disposed on end portion, corresponding to said overhang sections of said each tooth of the one gear, each of which overhangs diagonally from each of said both tooth flank sides toward adjacent tooth sides; and said overhang sections of the one gear as well as said opposite overhang sections of the other gear are elastically deformed due to meshing of the teeth of said pair of gears during the rotation of said pair of gears, to thereby absorb a given amount of backlash.

* * * * *